UNITED STATES PATENT OFFICE.

THOMAS F. McEVOY, OF WATERBURY, CONNECTICUT.

ELECTRIC SWITCH.

SPECIFICATION forming part of Letters Patent No. 423,488, dated March 18, 1890.

Application filed November 25, 1889. Serial No. 331,420. (No model.)

*To all whom it may concern:*

Be it known that I, THOMAS F. McEVOY, a citizen of the United States, residing at Waterbury, in the county of New Haven and State of Connecticut, have invented certain new and useful Improvements in Electric Switches; and I do hereby declare the following to be a full, clear, and exact description of the invention, such as will enable others skilled in the art to which it appertains to make and use the same.

My invention relates more especially to double-pole switches, and has for its object to simplify and cheapen their construction and to improve their operation in use. With these ends in view I have devised the novel construction of which the following description, in connection with the accompanying drawings, is a specification, numbers being used to denote the several parts.

Figure 1 is a side elevation of my novel switch, the cap being removed, but the position thereof being indicated by dotted lines. Fig. 2 is a plan view, the cap being removed and the parts in the closed position; Fig. 3, a similar view, the parts being in the open position; Fig. 4, a cross-section on the line $x\,x$ in Fig. 2, and Fig. 5 is a cross-section on the line $y\,y$ in Fig. 2.

1 denotes the base, and 2 2 and 3 3 the binding-posts, of the two lines. For convenience in description I will call the wires 4 and 5, respectively, the "positive" and "negative" wires of the main line, and 6 and 7, respectively, the "positive" and "negative" wires of the loop or circuit.

Upon the binding-posts 2 2 are pivoted swinging arms 8 8. These arms are connected by pivoted link 9, which is made of suitable insulating material, so that the current cannot possibly pass from one arm to the other.

The binding-posts 3 3 are provided with suitable contact-points 10 10, which are adapted to be engaged by the swinging arms. These contact-points may be made of any suitable construction. I preferably, however, make each contact-point to consist of two plates, between which the swinging arms pass when it is desired to close the circuit. This insures a perfect contact when the arms are moved to the circuit-closing position, as the poles will engage the swinging arms with a frictional or knife contact and will retain the arms in the closed position until they are thrown out, as I shall presently explain.

My novel switch belongs to the class of switches commonly known as "snap-switches"—that is to say, the movements of the swinging arms in closing or breaking the circuits are instantaneous instead of gradual.

12 denotes a standard projecting upward from the base and adapted to rotate thereon.

13 denotes a cam made integral with or rigidly secured to this standard. The cam action is produced by flange $13^a$ on the under side of the cam, which is in form a volute scroll, the inner and outer ends of the scroll being connected by a straight portion, as clearly shown by dotted lines in Figs. 2 and 3.

14 denotes a double spring having upturned ends $14^a$, (see Fig. 1, and dotted lines, Figs. 2 and 3,) adapted to engage the flange of the cam. This spring may be of any suitable construction. I preferably use a high grade of wire and secure it in place by coiling the central portion thereof about a stump or stumps 15.

The operation of breaking and closing the circuit is as follows: Suppose the circuit to be closed, as in Fig. 2. To break the circuit the cam is given a half-rotation toward the right. It will be seen in Fig. 2 that the position of the two arms of the spring is such that the end of the upper arm of the spring engages the upper swinging arm to force it to the closed position, and that the lower swinging arm has been drawn to the closed position by link 9; furthermore, that the flange of the cam has drawn the lower arm of the spring out of engagement with the lower swinging arm. In Fig. 3 a half-revolution of the cam has been made. The first action of the flange of the cam when this movement commenced was to draw the upper arm of the spring away from the upper swinging arm, leaving said arm, however, between the plates of the contact-point, there being friction enough to hold it in position. At the same time that the upper arm of the spring is being drawn away from the upper swinging arm the lower arm of the spring is being drawn still farther inward by the inner end of the scroll until it reaches the shoulder at the inner end of the scroll, which I will designate as 16. As the half-movement of the cam is completed the lower arm of the spring will have reached the inner end of the scroll, and will pass off the shoulder, and will instantly spring to the outer end of the scroll—that is, the position shown in Fig. 3. The lower arm of the spring is thus caused to fly violently against the lower swinging arm and force it out of engagement with the lower contact-point, the link acting at the same time to draw the upper swinging arm out of engagement with the upper contact-point.

17 denotes stumps in the base to limit the movement of the swinging arms when they are thrown to either the open or closed positions. It will thus be seen that the action in closing or breaking the circuit is instantaneous, as at the time the lower arm of the spring passes off the inner end of the scroll at the shoulder the upper arm of the spring will be wholly out of the way of the upper swinging arm, so as to allow that arm to be drawn back by the link simultaneously with the movement of the lower swinging arm. The operation of closing the circuit is precisely the same. The cam is given another half-revolution, which carries it back to the position shown in Fig. 2. By the time the cam has reached that position the lower arm of the spring will be drawn inward out of the way of the lower swinging arm, so that when the upper arm of the spring passes off at the shoulder to force the upper swinging arm into engagement with the upper contact-point the lower arm of the spring will be wholly out of the way of the lower swinging arm, so that the link will draw it to its proper position.

18 denotes a finger-piece which is made of insulating material and is placed at the upper end of the standard for convenience in operating the switch. The upper end of the standard is preferably squared and the finger-piece provided with a socket adapted to engage the squared portion.

In order to insure that the switch shall not be damaged in the slightest should an attempt be made to turn it backward, I form the upper end of the shank in a separate piece, which I designate as 19. The lower end of piece 19 is provided with a right-handed screw-thread and the upper end of the standard proper with a threaded socket, adapted to be engaged thereby. This construction permits the finger-piece to be removed, so that the switch cannot be tampered with by unauthorized persons, and also insures that should power be applied to turn the switch backward, instead of disarranging the parts, piece 19 of the standard will turn backward in its socket, but without moving the standard proper.

Having thus described my invention, I claim—

1. In an electric switch, the combination, with binding-posts having contact-points and other binding-posts having swinging arms, said arms being connected by an insulated link, of a scroll-cam having a shoulder, and a double-armed spring, the arms thereof engaging the swinging arms and also the cam, so that when the parts are in the closed position partial rotation of the cam—sufficient to permit one arm of the spring to pass off the shoulder—will instantly throw the two swinging arms to the open position, and when the parts are in the open position the same movement will throw them to the closed position.

2. The combination, with binding-posts having contact-points and other binding-posts having swinging arms connected by an insulated link, of a scroll-cam having a shoulder, and a spring having arms engaging the cam and also the swinging arms, rotation of said cam acting to draw both arms of the spring inward until one arm thereof passes off at the shoulder, this arm acting to throw one of the swinging arms to the open or closed position, and the link controlling the other swinging arm.

3. Binding-posts having contact-points, and binding-posts provided with swinging arms connected by an insulated link, in combination with a cam having on its under outer edge a scroll-flange, the inner end of said flange terminating abruptly in a shoulder, and a spring having inwardly-extending arms engaging the opposite inner sides of said flange, and also the swinging arms, whereby when the parts are in either the open or closed position rotation of the cam will cause the flange to draw both arms of the spring inward until one arm passes off the shoulder, that arm of the spring then acting to throw both swinging arms from the open to the closed position, or vice versa.

4. The combination, with the binding-posts, the contact-points, and the swinging arms engaged by the arms of a spring, of a rotating standard carrying a scroll-cam which is engaged by the arms of the spring, as and for the purpose set forth, and the upper end of which is detachable and is provided with a squared portion adapted to receive a detachable handle, the lower end thereof being provided with a right-handed screw-thread engaging the shank proper, so that should the handle be turned backward the upper end of the standard will turn backward without moving the cam.

In testimony whereof I affix my signature in presence of two witnesses.

THOMAS F. McEVOY.

Witnesses:
C. A. WARREN,
CHAS. W. GILLETTE.